United States Patent [19]

Parker et al.

[11] Patent Number: 4,666,675
[45] Date of Patent: May 19, 1987

[54] MECHANICAL IMPLANT TO REDUCE BACK PRESSURE IN A RISER REACTOR EQUIPPED WITH A HORIZONTAL TEE JOINT CONNECTION

[75] Inventors: Wesley A. Parker, Houston; Donald E. Hardesty, Brookshire; Jack E. Stanley, Katy, all of Tex.

[73] Assignee: Shell Oil Company, Houston, Tex.

[21] Appl. No.: 797,347

[22] Filed: Nov. 12, 1985

[51] Int. Cl.⁴ .............................................. C10G 11/18
[52] U.S. Cl. .................... 422/147; 366/336; 366/338; 422/144; 422/145; 422/214
[58] Field of Search ............... 422/140, 144, 145, 214, 422/147; 366/336, 338

[56] References Cited

U.S. PATENT DOCUMENTS

| | | |
|---|---|---|
| 3,261,776 | 7/1966 | Baumann et al. .................... 208/113 |
| 3,475,326 | 10/1969 | Lockenbach ......................... 422/145 |
| 3,492,221 | 1/1970 | Pfeiffer ................................. 422/144 |
| 3,607,126 | 9/1971 | Pfeiffer ................................. 422/214 |
| 4,414,100 | 11/1983 | Krug et al. ........................... 422/144 |
| 4,495,063 | 1/1985 | Walters et al. ...................... 208/113 |

Primary Examiner—Barry S. Richman
Assistant Examiner—William R. Johnson
Attorney, Agent, or Firm—Kimbley L. Muller

[57] ABSTRACT

An apparatus to reduce the pressure drop in a riser reactor equipped with a horizontal tee joint connection which uses a mechanical implant located at a point juxtaposed the connection of the horizontal and vertical tubes to prohibit fine particle catalysts from backflow down through the elongated riser reactor which thereby provides an easy upflow of catalysts through the riser reactor.

13 Claims, 4 Drawing Figures

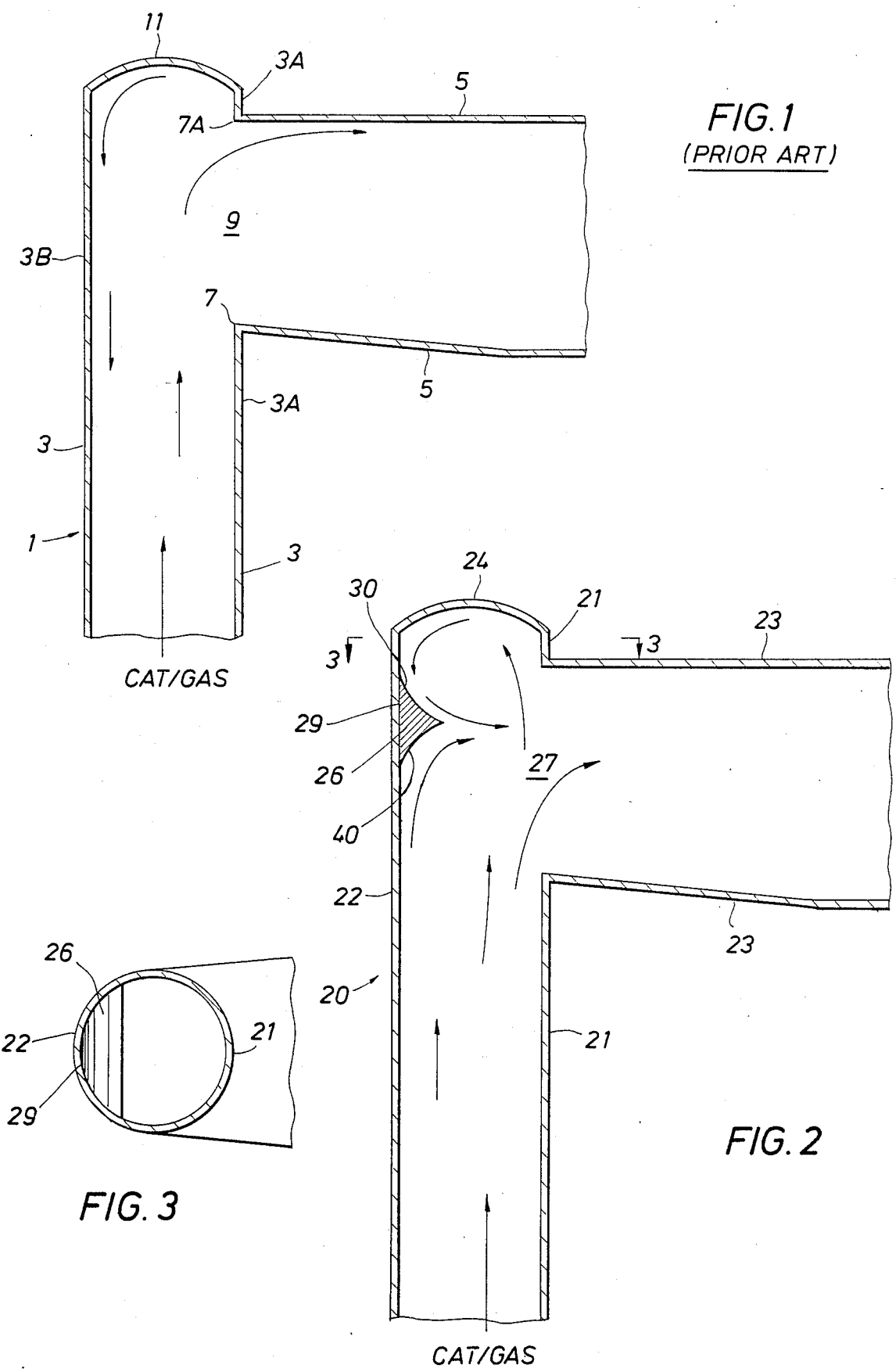

$I.D. = 3.0''$ $h = 0.75''$ $\dfrac{h}{ID} = 0.25$ $A = 0.15355$ $A = \dfrac{\pi}{4} d^2 = .7854(3)^2$ $\quad = 7.0686 \text{ in}^2$ AREA OF 0.75 SEGMENT:
$7.0686 \times 0.15355 = 1.085 \text{ in}^2$

MECHANICAL IMPLANT TO REDUCE BACK PRESSURE IN A RISER REACTOR EQUIPPED WITH A HORIZONTAL TEE JOINT CONNECTION

FIELD OF THE INVENTION

This invention concerns an apparatus used in the cracking of hydrocarbons, in the presence of a catalyst, to reduce the molecule size of the hydrocarbons. With the advent of new aluminosilicate catalytic compositions of matter, it has been found desirable to limit the residence time of the catalyst with the hydrocarbon, which is to be cracked, to only a period of time necessary to perform cracking. Usually, this residence time is no more than five seconds and usually less than three seconds. This objective was achieved in part at least by the development of hydrocarbon riser reactor cracking which has been the subject of a plethora of inventions in the recent past. Succinctly, the fine catalytic composition of matter rises very quickly concomitant and cocurrently with passage of a hydrocarbon stream existent in a vapor phase. (The hydrocarbon stream may be charged to the bottom of the riser reactor as a combined gas and liquid stream but usually rises upward through the riser reactor and is cracked in a vaporous phase.)

In order to conduct continuous processing of the hydrocarbon oil, it is necessary to reuse the catalyst. This can be accomplished in a regeneration unit in communication with the riser reactor through various solid/vapor separators and stripping zones.

Separation of the fine catalyst particles and the hydrocarbon product are made in a separation unit, usually referred to as a vertical or horizontal cyclone separator, which openly communicates with the riser reactor. It is necessary to transfer the mixed solid/vaporous phase from the upper portion of the riser reactor to the separation unit. Many attempts have been used to implement separation of the solid particles from the vaporous particles at egress from the riser reactor. Most of these type units utilize a cover shield or shroud over the top of the riser reactor having a contacting place which allows the vapors to rise and pass through slits in the top of the shroud coextensive with separation of the fine catalyst particles through slits in the bottom of the shroud, which then pass to a disengagement zone surrounding or beneath the riser reactor. Such shroud separation systems, which separate at least in part the vapor and solid via the force of gravity, are not the concern of the instant invention.

A number of riser reactors transfer a combined solid particle catalyst phase and vapor phase in a right angle curve path or a substantially right angle curve path to a horizontal cross member in open communication with a cyclone separator. In order to avoid the attrition via impact of the catalyst particles on the top of the riser reactor tube, the same is usually equipped with a cap located at a calculated distance above the intersection of the horizontal connecting conduit and the riser reactor. This cap is usually only an extension of the riser reactor pipe but can entail either a larger bonnet or an askewed surmounted void space. This invention concerns a configuration with either the extension of the riser pipe, the bonnet or the askewed cap leaving a finite area of riser reactor pipe between the top of the riser reactor pipe and the horizontal connecting tee joint.

One problem continually confronting the passage of catalysts and vapor in a conjunct passage upward through a riser reactor cracking tube is pressure drop. As the pressure drop mounts or rises in a riser reactor it becomes more difficult to provide a smooth consistent flow of catalyst and vapors up through the riser reactor tube. This invention seeks to mitigate problems of pressure drop by replacement of a mechanical implant at a precise position in the riser reactor tube.

BACKGROUND OF THE INVENTION

This invention concerns an improvement in an apparatus which contains a horizontal tee joint connection in a riser reactor. This tee joint connection defines a portion of the riser reactor both below and above the tee joint. The latter is open for the intended passage of catalyst and hydrocarbon vapors egressing in an upward manner through the riser reactor. It would seem that the space of the riser reactor above the tee joint is of little use. However, the same is necessary in order to reduce the attrition wear of the catalyst particles on the top of the riser reactor.

In 1985, U.S. Pat. No. 4,495,063 issued to Walters et al for a riser reactor cap for the conversion of carbometallic oils. The riser reactor contains an interconnecting horizontal passageway for the intended passage of catalyst from the riser reactor to the horizontal passageway. There does not appear to be any concern of pressure drop in the riser reactor, nor any apparatus to mitigate same. In fact, the invention is directed to a vented cap ballistics separation device used to achieve rapid separation of the suspension of fluidized solid particulate catalyst and vapors without causing undue wear in the top of the catalyst chamber.

OBJECTS AND EMBODIMENTS

An object of this invention is to provide a simple mechanical implant which can be retrofitted into existing tee joint connection riser reactors to reduce back pressure in the upward flow of catalyst and vapor through the riser reactor.

Another object of this invention is to provide a situs for positioning a mechanical implant in a tee joint connection of a riser reactor to eliminate the backflow of catalyst down the side of the riser reactor.

Another object of this invention is to provide a smooth and uniform passage of catalyst and vapors, in an upward manner, through a riser reactor and into a tee joint connection with a minimum pressure drop throughout the riser reactor.

Another object of this invention is to reduce problems of refluxing, recirculation and catalyst and vapor hold up at and above the riser reactor tee or elbow.

Another object of this invention is to reduce top and effects to eliminate undesirable broadening of the residence time distribution and possible overcracking.

In one aspect, an embodiment of this invention resides in an apparatus for passing combined phases of an admixture of a vapor phase and fine solid particles upward through a vertical elongated passageway and forcing said combined phases to a second passageway positioned at a substantially right angle with respect to said vertical elongated passageway which comprises: a vertical elongated passageway situated in a substantially vertical upright position having side walls, an imperforate top, and a bottom, wherein the bottom portion of said elongated passageway is possessed with inlet means to permit entry into said vertical upright elongated passageway of said combined phase admixture; a relatively horizontal elongated passageway situated substantially perpendicular to said vertical elongated passageway, and interconnecting, and communicating openly with the first of said two side walls of said vertical elongated passageway at the upper portion of said vertical elongated passageway and communicating with, at the other extreme, a solid particles-vaporous phase separation means; and a vertical elongated solid particle downflow prevention means located attached to and protruding from the second of said two side walls not communicating openly with said relatively horizontal elongated passageway and positioned at an elevation at least as high as the lowest interconnecting point of said relatively horizontal passageway with said vertical passageway.

Another embodiment of this invention comprises an apparatus for passing a vaporous hydrocarbon and fine particle size catalyst stream through a riser reactor with a reduction in pressure drop which comprises: a riser reactor elongated tube having an upper and a lower portion having hydrocarbon and fine particle size catalyst entry means in the bottom portion of said riser reactor; a horizontal hydrocarbon and fine particle size catalyst discharge tube interconnecting with said riser reactor elongated tube at an angle of about 90° with respect to said riser reactor elongated tube and in open communication therewith at the upper portion of said riser reactor; and a male mechanical implant protrudance extending from said riser reactor elongated tube at a point opposite the interconnection of said horizontal discharge tube and riser reactor elongated tube, wherein said male mechanical implant protrudance is placed on said riser reactor elongated tube at a point equal to a plane of an axis of said horizontal discharge tube.

BRIEF DESCRIPTION OF INVENTION

This invention concerns a mechanical implant or wedge for a riser reactor equipped with a tee joint connection to reduce back pressure in the riser reactor from a distance above the initial bottom of the riser reactor to a point as high as the upper portion of the tee joint connection.

DETAILED DESCRIPTION OF INVENTION

Pressure drop in a riser reactor is significantly reduced by the selective placement of the mechanical design implant of this invention. In a riser reactor hydrocarbonaceous gas or vapor material is passed upward in the presence of fine particulate catalysts to achieve the catalytic cracking of the hydrocarbons in the gaseous material to hydrocarbons of smaller molecules. With the advent of new aluminosilicate zeolite catalyts, the residence time in the riser reactor is a critical factor to consider in the cracking procedure. It is desired that the catalyst be in contact with the gas or vapor material for only a period of time necessary to perform the cracking. Any extension of this time results in undue coking of the catalyst and possible physical damage to the catalyst surface. For this reason the residence time in the riser reactor should preferably be between 1 and 5 seconds and most preferably between 2 to 3 seconds.

The catalyst charged to the riser reactor is normally derived from a coextensive and cooperating regeneration system. Suitable synthetic crystalline aluminosilicate zeolites can be any naturally occurring or man made crystalline aluminiosilicates normally employed in FCC cracking schemes. For example, the natural occurring crystalline aluminosilicates can be exemplified by faujasite, mordenite, clinoptilote, chabazite, analcite, stibite, leucite, etc. while the synthetic crystalline aluminosilicates may be exemplified by such silicates as zeolite X, zeolite Y, zeolite L, zeolite Z, zeolite A, etc. Specific examples of how to acquire contemplated zeolites are presented in U.S. Pat. Nos. 2,882,244, 3,008,803, 2,996,358, 3,011,869, 3,012,853, etc.

The feed material to the riser reactor is normally heated to a significantly high enough temperature to make the feed fluid for pumping introduction into the riser reactor. It is preferred that the feed be entered to the riser reactor as a mixed phase feed with a preheat temperature as high as 700° to 800° F. The catalyst derived from the regeneration system is admixed with the feed material, the former having a very high temperature (such as 1000° F.) to act as a heat sink for the hydrocarbon feed material. The vapor velocity in the riser reactor will usually comprise between 25 and 35 feet per second, but may range up to 100 feet per second or higher. This velocity should be calculated to provide contact of the catalytic material with the vapor phase for a period of time only for a duration sufficient to complete the cracking of the larger hydrocarbon molecules to smaller hydrocarbon molecules and to mitigate the buildup of coke on the catalyst material.

The pressure in the riser reactor may range from 10 to 35 psig. The ratio of catalyst to feed hydrocarbon will depend upon the variety of feedstock but will normally be within the range of 3 to about 15.

The riser reactor is described as a vertical elongated passageway tube having a length to diameter ratio of at least 10 and more preferably between 25 and 30. Before the catalyst and vapor phase ascends to the top of the riser reactor, a horizontal tee joint comprising a horizontal elongated tube communicates openly with the riser reactor. The distance from the top of the riser reactor to the tee joint interconnection will vary depending on the diameter and height of the riser reactor. It should be noted, however, that the cap for the riser reactor should be of sufficient height above the tee joint so as to avoid or mitigate catalyst attrition on the top portion of the riser reactor and thereby eliminate metal fatigue. It is also contemplated within the scope of this invention that the cap may be askewed at an angle so as to further eliminate attrition wear. Also, an inverted wedge may be placed at the top of the riser reactor as exemplified in FIG. 3 of aforementioned U.S. Pat. No. 4,495,063.

The intersection of the tee joint with the riser reactor is preferably made at a 90° angle. However, in order to better position the respective horizontal or vertical cyclone separator with respect to the riser reactor, the horizontal connecting tube or passageway may be placed at an angle of less than 90° with respect to the vertical axis of the riser reactor. This will act to eliminate accumulation of solid particulate catalytic material in the horizontal connecting passageway and thereby prevent decomposition of the catalyst and fire hazards. The formed resultant angle can be an acute angle of the horizontal passageway with respect to the vertical passageway of between 89° to 75°. The horizontal passageway may also be equipped with certain flow deflection means so as to also avoid attrition of the high speed catalyst particles continually contacting the horizontal passageway at a consistent point in the top of same.

The mechanical implant of this invention is most preferably a hollow or solid wedge-like structure. It is also contemplated that a selectively located shelf or angle iron can be utilized as the male protrudance or flow deflection means extending from the wall opposed to the tee connection to accomplish mitigation of the pressure drop in the riser reactor. The selective placement and location of the flow prevention means relative to the horizontal tee joint is critical to reducing pressure drop. The riser reactor has two elongated side walls even though both connect to form a continuous circular interior of the riser reactor. The first of these side walls interconnects and is in open communication with the horizontal tee joint. The second of the side walls is relatively imperforate (with the possible exception of entry lines of feed and catalyst in the bottom of same) and opposes the first side wall. The flow prevention means is selectively attached to the second such relatively imperforate wall opposed to the tee joint connection. The attachment may be by any means known in the art, such as welding or a fastening securement means, with welding being the easiest and most feasible method of attachment. The minimum height of the selective location of the back flow prevention means is placement opposed to the lowest point of the intersecting tee joint connection while the maximum height of the selective location is preferably lower than the highest point of the intersecting tee joint connection. Surprisingly, if the selective height falls below the required minimum, the implant will simply not have a positive effect on the pressure drop while placement at a height above the maximum greatly reduces the efficiency of the implant to mitigate pressure drop.

The high activity aluminum silicate catalyst currently used in FCC processing requires quick disengagement from the cracked hydrocarbon product. This invention provides the advantage of having a smaller disengaging device necessary to accomplish this task. As shown in the instant example illustrative of this invention, the pressure drop differential reduction across the riser reactor decreases with an increase in the air flow rate.

BRIEF DESCRIPTION OF THE DRAWINGS

FIG. 1 is a side view of a riser reactor with a relatively horizontal tee joint connection as utilized in the prior art (no implant).

FIG. 2 is a side view of a riser reactor with a mechanical implant of this invention and backflow prevention acquired derivative thereof.

FIG. 3 is a top plan elevation view looking downward through the top of the riser reactor.

DETAILED DESCRIPTION OF THE DRAWINGS

Figure 4:
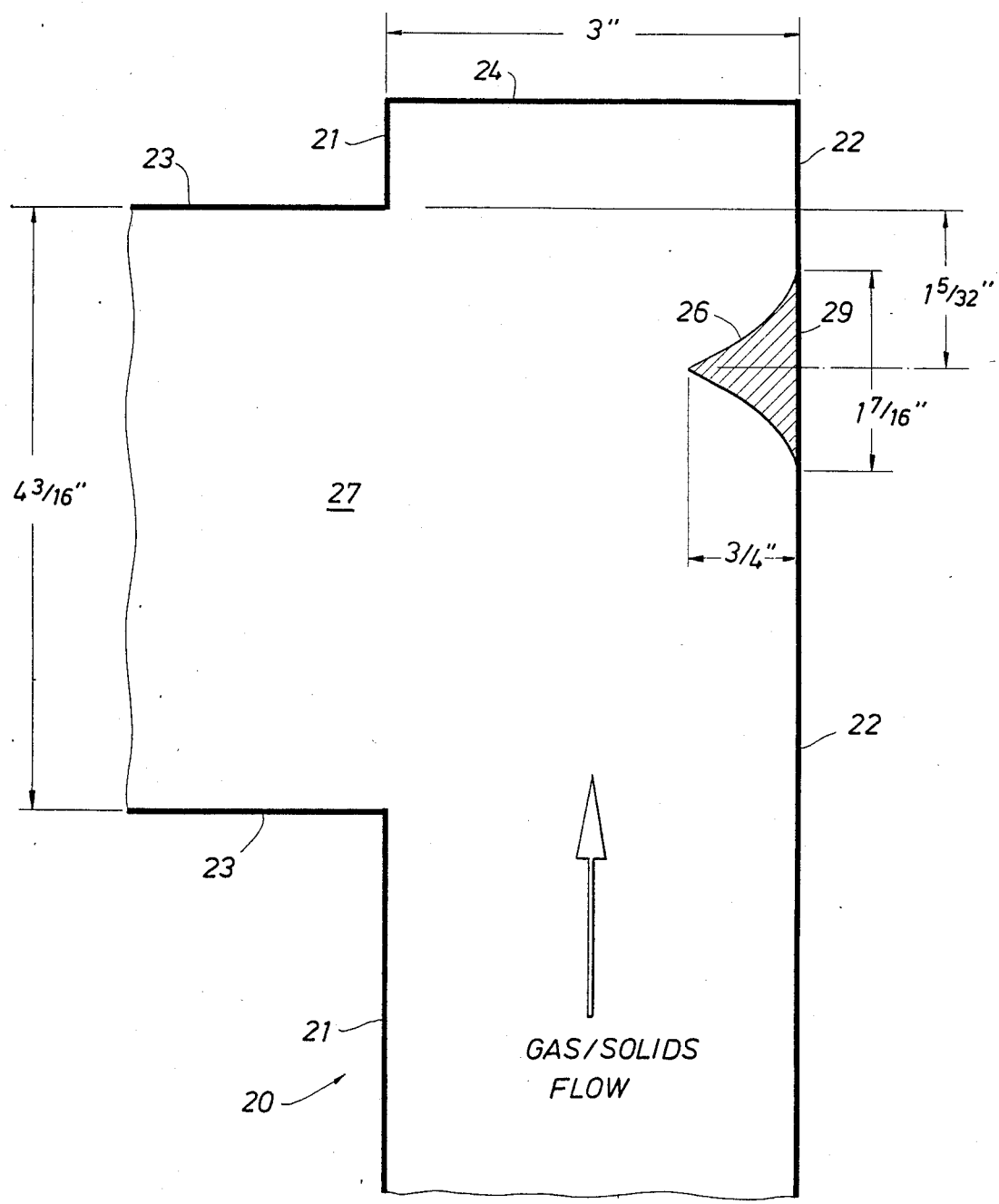
FIG. 4 gives a description of potential dimensions utilized in a mock-up of a simulated riser reactor utilizing catalyst solids with air or nitrogen fluid flow in placement of the reactant hydrocarbon. An apparatus made of clear plastic similar to that of FIG. 4 was used in the illustrative embodiment which follows.

FIG. 1 shows a riser reactor 1 having two side walls 3. Usually these side walls are of circular nature and will interconnect one another to make a geometric circle enclosing the riser reactor. One of the side walls 3A is in interconnection with a horizontal tee joint 5 at points 7 and 7A. Thus, the horizontal passageway communicates with riser reactor 1 at open communication 9. The second wall of the riser reactor 3B is relatively imperforate and again, the riser reactor is usually of a curved nature. The flow of catalyst material is depicted by the arrows. It can clearly be seen that the gas and solid materials contact the interior portion of top cap 11 of riser reactor 1 and flow back down imperforate wall 3B of the riser reactor. This creates problems in pressure drop which are mitigated or vitiated by this invention.

FIGS. 2 through 4 demonstrate and exemplify the simple yet novel mechanical implant of this invention to reduce pressure drop problems. Riser reactor 20 has two side walls 21 and 22. Side wall 21 is in open communication with horizontal passageway 23 at 27. Imperforate side wall 22 communicates with side wall 21 via cap 24. The passage of catalyst and gas is upward (inlet of same at bottom of the riser reactor is not shown) through the riser reactor as shown by the arrows. Both contact the top portion of riser reactor 24 (as in FIG. 1, cap 11) but do not flow down the back side of imperforate wall 2 as a result of implant wedge 26.

Therefore the downflow prevention means or male protrudance normally has on one side a surface complementing the curve of the curved section of the relatively imperforate side wall opposed to the tee joint connection. It is preferred that this connection be made to no more than 50% of the circular vessel and that such connection be made at a point juxtaposed and opposite to the open communication with the horizontal elongated passageway.

The shape of the flow prevention means may comprise either a right angle triangle with a sloped hypotenuse or an isosceles triangle with two or three curved lines, preferably in concave shape. The flow diversion means will preferably have a solid geometry configuration and should be designed to give the greatest incentive to divert the flow of catalyst up the riser reactor to the open communication with the horizontal elongated tube and also to divert the flow of catalyst down from the top of the riser reactor to open communication into the horizontal elongated tube. In any event, the catalyst descending from the top of the riser reactor will be substantially prevented from descending into the riser reactor passageway below the point of the tee joint connection. In fact, without use of this flow prevention means, the catalyst particles and vapor will flow as shown in the FIG. 1. Without this selective placement of the implant the catalyst particles will flow down the back or imperforate wall of the riser reactor and thereby increase pressure drop. This inhibits the upward passage of vapor and solid particles through the riser reactor and thereby further increases pressure drop. The simply and easy to retrofit mechanical implant acts to mitigate pressure drop in a standard riser reactor having a horizontal tee joint therein.

The protrudance or the flow prevention means into the open area off the riser reactor should be equal to no more than one third of the diameter of the riser reactor. The minimum distance of protrudance should be sufficient to eliminate the back flow of catalyst particles but should not fall below one tenth (10%) of the diameter of the riser reactor elongated tube. The volume space occupied by the back flow prevention means over a cross section of the riser reaction tube should be between 5 and 30%. The height of the back flow prevention means is ascertained by the minimum communication height with the horizontal tee joint.

The wedge is shown in FIG. 2 as a solid isosceles triangle with sloping sides to give more direction to the catalyst flow both off top cap 24 and up through the riser reactor 20 to open communication with space 27. Concave sloping side 30 act as flow direction means as well as a backflow prevention means. Concave sloping side 40 act also as a gas/solids flow direction device to improve open communication of the vertical elongated riser-reactor with the relatively horizontal passageway. Any other configuration of the triangle can be retrofitted into the riser reactor (i.e. equilateral) but the isoscales and right triangles are preferred.

The flow prevention means or male protrudance 26 can have the configuration of a right angle triangle with a relatively flat and straight bottom but having a hypotenuse with a concave configuration as shown by side 30 of isosceles triangle 26 of FIG. 2. Even a simple planar angle iron could be utilized, although the same is not preferred. The back portion of wedge 26 is denoted as 29 and interconnects imperforate side wall 22 by which securement is made via welding or fastening means, whichever is most desired. As shown in FIG. 3, the configuration of side 29 is most preferably the complement of the curvature of imperforate wall 22 so as to provide a good seal between unit 29 and 22 and to prevent the backflow of any catalyst particles between these two entities.

In FIG. 4, a simulated model is shown with the explicit dimensions of the configuration of FIG. 2. And FIG. 2 also shows the probable angle of horizontal passageway 23 with the vertical riser reactor 20 (less than a right angle but more than 75°) to prevent the accumulation of unwanted catalyst particles in the bottom portion of 23. The dimensions of FIG. 4 are set forth on the drawing.

ILLUSTRATIVE EMBODIMENTS

In this illustrative embodiment, a scaled model as shown in FIG. 4 was prepared with transparent sides to follow the flow of the catalyst and gas phases through the riser reactor into the horizontal connecting tube and then into a downstream cyclone separator. The dimensions of the apparatus were very similar to those shown in FIG. 4. The temperature and pressure were not synonymous with a commercial embodiment in light of the use of nitrogen or air as the gaseous phase in replacement of a vaporized hydrocarbon. The pressure drop was determined at the end of the riser reactor and at the horizontal tee joint connection in an embodiment commensurate with FIG. 1 (prior art). The balance of the differential pressure was increased by the downstream cyclone. The conditions of air quantity and solids and solids to air are set forth in Table 1.

TABLE I

| CONDITIONS | | | % dp | |
|---|---|---|---|---|
| AIR scfm | SOLIDS lb/min | SOLIDS/AIR lb/lb | END RISER | TEE |
| 101 | 35 | 4.5 | 50 | 27 |
| 101 | 50 | 6.5 | 49 | 30 |
| 101 | 60 | 7.8 | 50 | 31 |
| 138 | 35 | 3.3 | 35 | 23 |
| 138 | 50 | 4.7 | 38 | 30 |
| 138 | 60 | 5.7 | 39 | 31 |
| 168 | 35 | 2.7 | 29 | 19 |
| 168 | 50 | 3.9 | 38 | 26 |
| 168 | 60 | 4.7 | 40 | 25 |
| 188 | 35 | 2.4 | 32 | 23 |
| 188 | 50 | 3.5 | 30 | 27 |
| 188 | 60 | 4.2 | 29 | 30 |

The scaled up model was then installed with a contoured wedge of this invention (FIGS. 2-4) that opposed and projected towards the horizontal tee joint and the total pressure drop differential with the wedge implant was recorded as follows in Table 2 which also shows for comparison the total dp of the riser reactor without the implant.

TABLE 2

| AIR scfm | SOLIDS lb/min | TOTAL dp with implant | TOTAL dp without implant | $\Delta$dp |
|---|---|---|---|---|
| 101 | 0 | 2.5 | 3.6 | 1.1 |
| 101 | 35 | 3.1 | 5.2 | 2.1 |
| 101 | 50 | 4.8 | — | — |
| 101 | 60 | 5.3 | — | — |
| 148 | 35 | 5.1 | 7.8 | 2.7 |
| 148 | 50 | 5.9 | 8.9 | 3.0 |
| 148 | 60 | 6.7 | 10.5 | 3.8 |
| 178 | 35 | 7.5 | 8.1 | 0.6 |
| 178 | 50 | 8.3 | 9.9 | 1.6 |
| 178 | 60 | 9.6 | 10.5 | 0.9 |
| 203 | 35 | 8.6 | 9.9 | 1.3 |
| 203 | 50 | 9.3 | 10.2 | 0.9 |
| 203 | 60 | 10.2 | — | — |

This showing is tantamount to processing of a gaseous material inclusive of a hydrocarbon, which is to be cracked. It can clearly be seen that as the speed of the air flow increased up through the riser reactor, the reduction in the pressure drop mitigated. For example, the $\Delta$dp was much higher at speeds of 148 scfm than the $\Delta$dp at air speeds of 178 or 203 scfm. It is unexpected that the pressure drop differential was consistently so low simply derivative of selective placement of the mechanical implant of this invention.

What we claim as our invention:

1. An apparatus for passing combined phases of an admixture of a vapor phase and fine solid particles upward through a first passageway and forcing said combined phases to a second passageway positioned at a substantially right angle with respect to said first passageway which comprises:
   (a) a first passageway comprising a vertical passageway having a diameter and being situated in a substantially vertical upright position, with said first passageway further having a plurality of side walls, and imperforate top, and a bottom portion, wherein said bottom portion of said first passageway includes an inlet means to permit entry into said first passageway of a combined fine solid particle-vapor phase stream;
   (b) a second passageway comprising a relatively horizontal elongated passageway situated substantially perpendicular to said first passageway and interconnecting and communicating openly at one end with a first of said side walls at an upper portion of said first passageway to define a tee joint interconnection wherein a first portion of said first passageway is situated below said second passageway and a second portion of said first passageway is situated above said second passageway, and wherein said second portion terminates at said imperforate top, and wherein said second passageway communicates with at the other end, a solid particle-vaporous phase separation means; and
   (c) a particle downflow prevention means to reduce the pressure drop through said first passageway and to direct particles away from passage down from a second of said side walls and into said second passageway, said particle downflow prevention means located, attached to and protruding from the second of said side walls to a distance of not more than one-third the diameter of said first passageway and occupying a volume space in said first passageway of between 5 to 30% and selectively situated opposed to said second passageway and located at an elevation at least as high as a lowest interconnecting point of said tee joint interconnection of said second passageway with said first passageway and at least as low as a highest interconnection point of said second passageway with said first passageway.

2. The apparatus of claim 1 wherein said vapor phase comprises a vapor hydrocarbon phase and said fine solid particles phase comprises an aluminosilicate catalytic composition of matter.

3. The apparatus of claim 1 wherein said first passageway is designed of sufficient length to permit a flow residence time up through said first passageway of 2 to 3 seconds.

4. The apparatus of claim 1 wherein said first passageway interconnects with said second passageway at a substantially right angle comprising an angle of 89° to 75° with respect to the vertical axis of said first passageway.

5. The apparatus of claim 1 wherein said imperforate top is an imperforate surmounted cap as a closed extension of the diameter of said first passageway.

6. The apparatus of claim 1 wherein said particle downflow prevention means is situated and anchored against the interior of said second side wall and wherein said flow prevention means has a surface configuration on the side juxtaposed to said second side wall of a curve complementing the curve of said second side wall.

7. An apparatus for passing a hydrocarbon/fine particle size catalyst stream through a vertical riser reactor with a reduction in pressure drop having a horizontal catalyst tee joint discharge means which comprises:
  (a) a vertical riser reactor having a diameter and means defining an upper and a lower portion and further having hydrocarbon and fine particle size catalyst entry means in the lower portion of said riser reactor;
  (b) a horizontal hydrocarbon and fine particle size catalyst tee joint discharge tube interconnecting with said riser reactor at an angle of about 90° with respect to said riser reactor and in open communication therewith at said upper portion of said riser reactor; and
  (c) a mechanical implant protrudance means extending from the interior of said riser reactor for a distance of not more than one-third of the diameter of said riser reactor and occupying a volume space of said riser reactor of between 5 and 30% and positioned at a point opposite the interconnection of said discharge tube and riser reactor, wherein said mechanical implant protrudance means is placed on said riser reactor so to reduce said pressure drop through said riser reactor and to direct particles away from passage down said riser reactor.

8. The apparatus of claim 7 wherein said mechanical implant protrudance means extending from said riser reactor comprises a right angle planar surface having a semi-circular back side for attachment to the interior of said riser reactor.

9. The apparatus of claim 7 wherein said mechanical implant protrudance means extending from said riser reactor has a cross-sectional shape of a right triangle with the hypotenuse comprising a curved line having a concave slope.

10. The apparatus of claim 7 wherein said mechanical implant protrudance means extending from said riser reactor has a cross-sectional shape of a isosceles triangle with two even sides protruding from the interior of said riser reactor and having curved lines configuring a concave slope.

11. The apparatus of claim 7 wherein said tee joint discharge tube and said riser reactor intersect to form a portion of said riser reactor below said discharge tube and a portion of said riser reactor above said discharge tube, wherein said portion of said riser reactor above said discharge tube communicates with a top of said riser reactor.

12. The apparatus of claim 7 wherein the hydrocarbon and catalyst discharge tube forms an acute angle with respect to the vertical axis of said riser reactor.

13. The apparatus of claim 12 wherein said acute angle is between 89° and 75° with respect to the vertical axis of said riser reactor.

* * * * *